United States Patent
Koehler et al.

(10) Patent No.: US 8,167,245 B1
(45) Date of Patent: May 1, 2012

(54) FUEL BARRIER

(75) Inventors: Thomas A. Koehler, Lake Forest Park, WA (US); Richard Bruce Tanner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 12/611,729

(22) Filed: Nov. 3, 2009

(51) Int. Cl.
*B64C 1/00* (2006.01)

(52) U.S. Cl. ............... 244/123.1; 244/123.6; 244/135 R (58) Field of Classification Search ............... 244/123.1, 244/123.5, 123.7, 123.8, 124, 131, 119, 120, 244/117 R, 135 R; 428/116
See application file for complete search history.

(56) References Cited

U.S. PATENT DOCUMENTS

| | | | | |
|---|---|---|---|---|
| 4,108,328 A | | 8/1978 | Page | |
| 4,189,059 A | | 2/1980 | Shaw | |
| 4,304,376 A | * | 12/1981 | Hilton | 244/123.6 |
| 4,432,515 A | * | 2/1984 | Jarvineva | 244/123.5 |
| 4,715,417 A | | 12/1987 | Coloney | |
| 5,332,178 A | * | 7/1994 | Williams | 244/123.3 |
| 5,851,336 A | * | 12/1998 | Cundiff et al. | 156/272.2 |
| 5,983,945 A | * | 11/1999 | Salmon | 137/899.2 |
| 6,638,466 B1 | * | 10/2003 | Abbott | 264/238 |
| 6,830,218 B2 | * | 12/2004 | Kordel et al. | 244/132 |
| 6,910,659 B2 | * | 6/2005 | Friddell et al. | 244/135 R |
| 6,997,415 B2 | * | 2/2006 | Wozniak et al. | 244/135 C |
| 7,090,167 B2 | * | 8/2006 | Friddell et al. | 244/123.1 |
| 7,202,321 B2 | * | 4/2007 | Byrd et al. | 528/26 |
| 7,708,281 B2 | * | 5/2010 | West | 277/312 |
| 7,850,816 B2 | * | 12/2010 | West et al. | 156/308.2 |
| 7,909,292 B2 | * | 3/2011 | Law | 244/219 |
| 7,915,371 B2 | * | 3/2011 | Byrd et al. | 528/26 |
| 2004/0075027 A1 | * | 4/2004 | Friddell et al. | 244/135 R |
| 2008/0023585 A1 | * | 1/2008 | Kordel et al. | 244/123.5 |
| 2008/0099613 A1 | * | 5/2008 | Ackermann et al. | 244/123.13 |
| 2008/0173757 A1 | * | 7/2008 | Tanner et al. | 244/119 |
| 2008/0210821 A1 | * | 9/2008 | Tanner et al. | 244/123.3 |
| 2009/0283639 A1 | * | 11/2009 | Ackermann et al. | 244/131 |
| 2010/0051749 A1 | * | 3/2010 | Tanner | 244/135 R |

* cited by examiner

*Primary Examiner* — Joshua J Michener
*Assistant Examiner* — Medhat Badawi
(74) *Attorney, Agent, or Firm* — Yee & Associates, P.C.

(57) ABSTRACT

Embodiments of the present disclosure provide an apparatus, method, and system for managing deflections comprising a fuel dam, a first portion of the fuel dam connected with a stringer, a second portion of the fuel dam connected with the first portion, and a third portion of the fuel dam. The second portion is more flexible than the first portion. The third portion is connected with the second portion, and connected with a rib. The second portion accommodates deflection between the stringer and the rib.

20 Claims, 5 Drawing Sheets

FUEL BARRIER

BACKGROUND INFORMATION

1. Field

The present disclosure relates generally to aircraft and, in particular, to a method and apparatus for a fuel barrier within a wing. Still more particularly, the present disclosure relates to a method and apparatus for managing deflections in an aircraft wing fuel tank.

2. Background

Fuel tanks in some aircraft are contained within the aircraft structure that has been sealed to allow fuel storage. An example of this type is the "wet wing" commonly used in larger aircraft. Since these tanks are part of the aircraft structure, the tanks are designed to meet the structural integrity requirements as well as function of fuel tanks. Large transport aircraft may store fuel in the wings and/or tail of the aircraft. This configuration reduces the weight and complexity as compared to a bladder system.

A fuel barrier may be located between wing ribs and wing panels for fuel containment at fuel tank boundaries in an aircraft. In a wet wing, every joint and fastener along the fuel tank boundary may be sealed to prevent fuel leaking or seeping to the exterior. The sealant may conform to expansion and contraction due to temperature changes. The sealant retains its sealing properties when submerged in fuel, and when left dry for long periods of time. The weight or dynamic loading of the fuel deflects the wing rib relative to the wing stringer. The deflection may cause the sealant to crack when exposed to −65° F. The cracks may allow fuel to leak across the tank boundary. Working with this sealant can be difficult. For example, replacing old sealant inside a small wing tank can be particularly difficult if the old sealant needs to be removed in addition to installing a new sealant.

The stringer may be an enclosed cross section, similar to a hat stringer. Access holes may be provided in the hat section for fastener installation. In addition to the mechanical fasteners, these areas may be sealed to ensure fluid tight design.

Accordingly, it would be advantageous to have a method and apparatus, which takes into account one or more of the issues discussed above as well as possibly other issues.

SUMMARY

An embodiment of the present disclosure provides an apparatus. The apparatus comprises a member, a first portion of the member connected with a first body, a second portion of the member connected with the first portion, and a third portion of the member. The second portion is more flexible than the first portion. The third portion is connected with the second portion and connected with a second body. The second portion accommodates deflection between the first body and the second body.

Another embodiment of the present disclosure provides a method for managing deflection between two bodies. A first portion of a member is connected to a first body. A third portion of the member is connected to a second body. The first portion and the third portion are connected with a second portion of the member to accommodate deflections by bending between the first body and the second body.

Yet another embodiment of the present disclosure provides a system for managing deflections. The system comprises a structure comprising a first body and a second body, a first portion of a member connected with the first body, a second portion of a member connected with the first portion, and a third portion of the member. The second portion is more flexible than the first portion. The third portion is connected with the second portion and connected with the second body. The second portion accommodates deflection between the first body and the second body.

The features, functions, and advantages can be achieved independently in various embodiments of the present disclosure or may be combined in yet other embodiments in which further details can be seen, with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
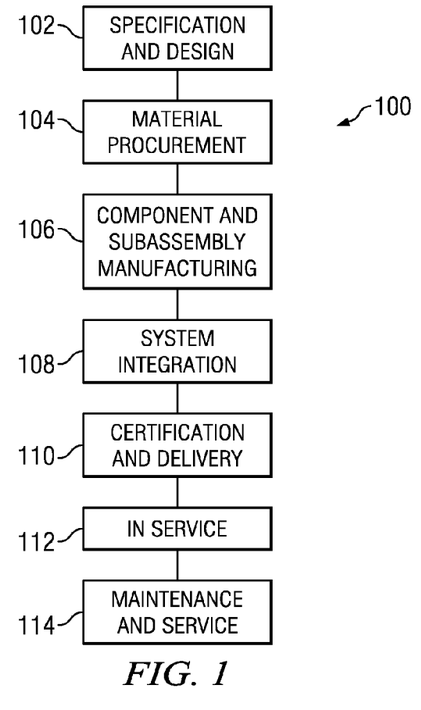
FIG. 1 is an illustration of an aircraft manufacturing and service method in accordance with an advantageous embodiment.
Figure 2:
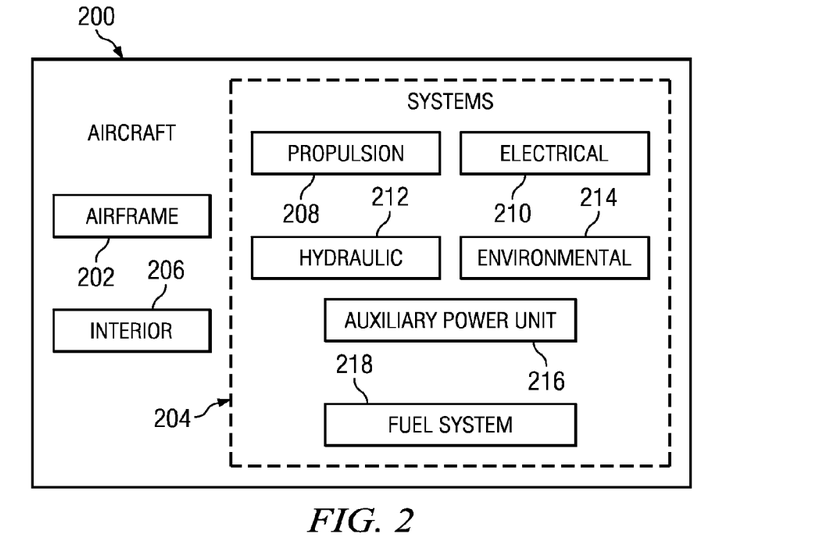
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of plurality of systems 204 include one or more of propulsion 208, electrical 210, hydraulic 212, environmental 214, auxiliary power unit 216, and fuel system 218. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

The different advantageous embodiments recognize and take into account a number of different considerations. For example, the different advantageous embodiments recognize and take into account that a fuel dam solution uses mechanical fastening to limit deflections and maintain seal integrity. The different advantageous embodiments recognize and take into account that limiting deflections may add weight and cost to the aircraft. This solution, using mechanical fastening to the stringers is heavy, difficult to assemble, and costly due to the limited tool access and quantity of fasteners. Additionally, part cost is high due to the extensive machining required to produce a fuel dam. Alternatively, if the fuel dam is formed of aluminum, costs are high as a result of deep draw hydro press forming and trimming processes. If the fuel dams are minimally fastened, a probability of sealant break down due to structural deflections exists.

The different advantageous embodiments recognize and take into account that solution minimizes cost and complexity by not using fasteners in areas of low deflection. However, this solution still utilizes fasteners in areas of high deflections that contribute to increased cost and weight.

The different advantageous embodiments also recognize and take into account that mechanical fastening may require access to the interior of hat stringers. Weight, complexity, and cost are increased by providing an access hole in the hat for fastener installation. This design requires fasteners common to the stringer cap and rib chord to limit deflections, which also add weight, complexity, and cost. Any access holes provided in the stringer for fastener access must subsequently be covered to maintain the fuel tank boundary. If single-sided fasteners are used on hat stringers, no access to the collar of the fastener exists, and spark-free requirements are not met. If spark-free protection is required for hat stringers, this would not be possible without access to the collar. Additionally, this single-sided fastener would have no capacity for inspection or repair, and cleaning drilling chips or dust would be difficult and costly.

The different advantageous embodiments provide a method and apparatus for managing deflections comprising a fuel dam, a first portion of the fuel dam connected with a stringer, a second portion of the fuel dam connected with the first portion, and a third portion of the fuel dam. The second portion is more flexible than the first portion. The third portion is connected with the second portion, and connected with a rib. The second portion accommodates deflection between the stringer and the rib.

Figure 3:
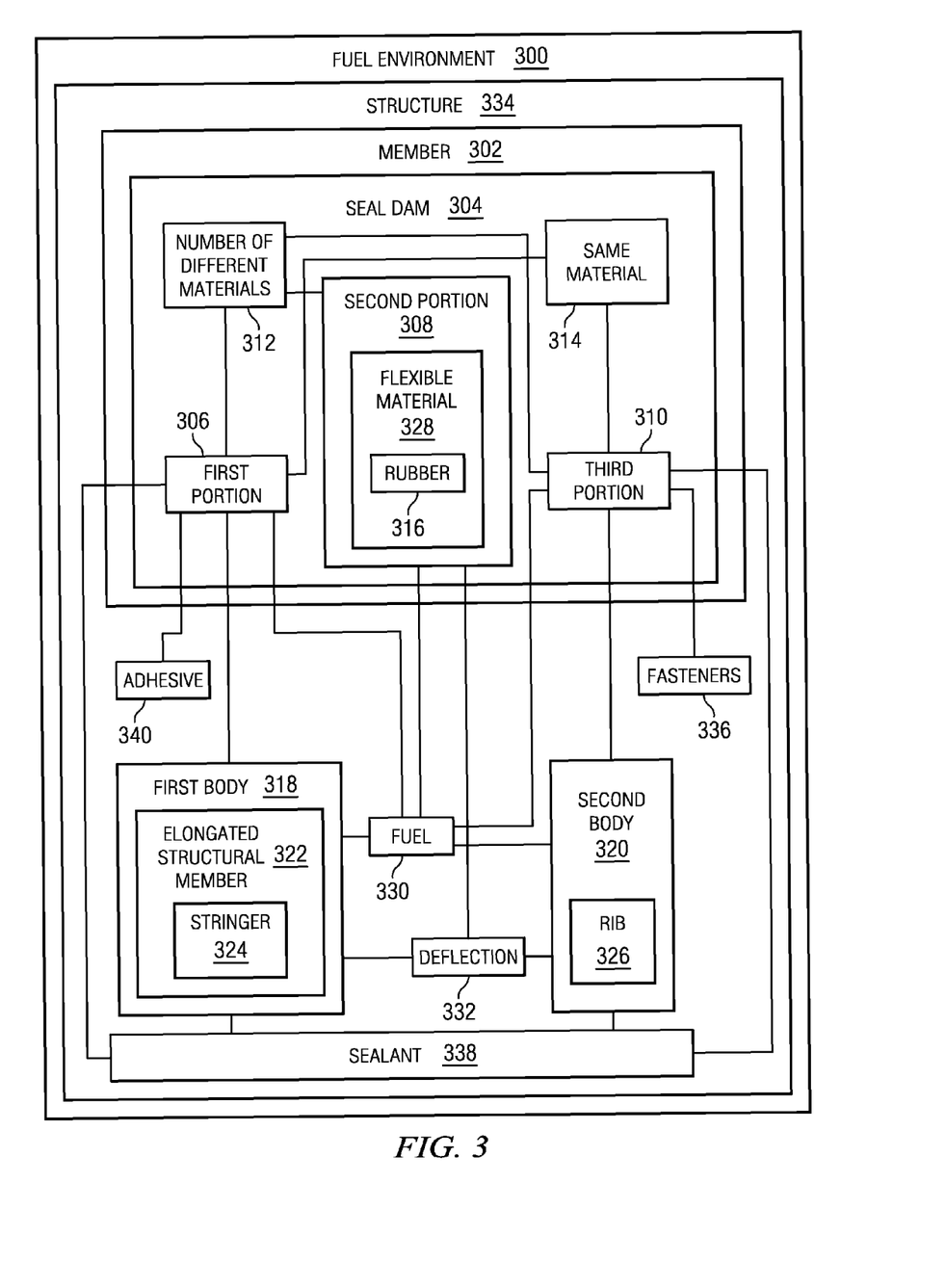
FIG. 3 is an illustration of a block diagram of a fuel environment in which an advantageous embodiment may be implemented.

Turning now to FIG. 3, an illustration of a block diagram of a fuel environment is depicted in accordance with an advantageous embodiment. Fuel environment 300 may be implemented along with fuel system 218 illustrated in FIG. 2. Fuel environment 300 may comprise structure 334. Structure 334 may be any type of structure which houses fuel and any parts relating to fuel. Structure 334 may be, for example, but not limited to, a wing of an aircraft.

Structure 334 may comprise member 302, first body 318, second body 320, deflection 332, and fuel 330. Member 302 may be connected to first body 318 and second body 320. Deflection 332 may occur between first body 318 and second body 320. Member 302, first body 318, and second body 320 provide a barrier for fuel 330.

Member 302 may provide a barrier across a gap between first body 318 and second body 320. Member 302 may be, for example, but not limited to, seal dam 304. Seal dam 304 may also be referred to as a fuel dam. Seal dam 304 may prevent fuel 330 from leaking between first body 318 and second body 320. In one or more embodiments, fuel 330 may be, but not limited to, any type of liquid and/or gas. Fuel 330 may be, for example, water, oxygen, and/or hydrogen.

Seal dam 304 may comprise first portion 306, second portion 308, and third portion 310. First portion 306, second portion 308, and third portion 310 may be of same material 314, or of number of different materials 312. When first portion 306, second portion 308, and third portion 310 are of same material 314, second portion 308 may be thinner than first portion 306 and third portion 310. With second portion 308 being thinner than first portion 306 and third portion 310, flexibility may be present in second portion 308. Flexibility may be present in second portion 308 when second portion 308 is made of a flexible material. The flexibility may be caused by the material or size of second portion 308. Some materials may be flexible on their own regardless of size and some materials may be flexible at certain thicknesses. Flexibility may be defined as the ability to bend without breaking. Also, flexibility may be defined by the ability to withstand stress without taking injury or damage. In another embodiment, first portion 306, second portion 308, and third portion 310 may be number of different materials 312. For example, first portion 306 and third portion 310 may be aluminum, while second portion 308 may be flexible material 328, such as, but not limited to, rubber 316, aluminum, and/or plastic. Second portion 308, being flexible, accommodates deflection 332 between first body 318 and second body 320. Deflection may be the movement of a structure or structural part as a result of stress. Stress may be the result of some outside force, such as, but not limited to, air turbulence. By accommodating deflection, second portion 318, which is flexible, may bend to accept the movement caused by the deflection instead of a different component. In one or more advantageous embodiments, first body 318 may be stringer 324 and second body 320 may be rib 326. In one or more embodiments, deflection 332 may occur during flight of an aircraft, such as aircraft 200 as illustrated in FIG. 2.

Sealant 338 is a material located around the edges of seal dam 304, such as, but not limited to, a polysulfide sealant. Sealant 338 may be a viscous material that changes state to become solid, once applied, and is used to prevent the penetration of air, gas, noise, dust, fire, smoke or liquid from one location through a barrier into another. Sealant 338 may break down when deflection is greater than a threshold. In some advantageous embodiments, the threshold may be about 0.01 inches. For example, difficulties may be present during some cold conditions when sealant 338 may break down under certain amounts of deflection. Fasteners 336 are devices used to connect seal dam 304 to second body 320. Fasteners 336 may be for example, nuts and bolts, rivets, or some other suitable type of devices. Adhesive 340 may be a material that is used to connect seal dam 304 to first body 318. This material may be, for example, without limitation, a sealant, a bonding agent, or some other suitable type of material. Adhesive 340 may also be used to connect seal dam 304 to second body 320. In one or more embodiments, three fasteners 336 are used. In other advantageous embodiments, a different number of fasteners 336 may be used or fasteners 336 may be omitted.

First body 318 may be elongated structural member 322, such as, for example, but not limited to, stringer 324. Second body 320 may be structures similar to a wall, such as, for example, rib 326.

The illustration of fuel environment 300 in FIG. 3 is not meant to imply physical or architectural limitations to the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, first body 318 may be connected to third portion 310 instead of first portion 306 of FIG. 3. Likewise, second body 320 may be connected to first portion 306 instead of third portion 310 of FIG. 3. While adhesive 340, fasteners 336, and sealant 338 are shown, any combination of these may be used in FIG. 3.

Figure 4:
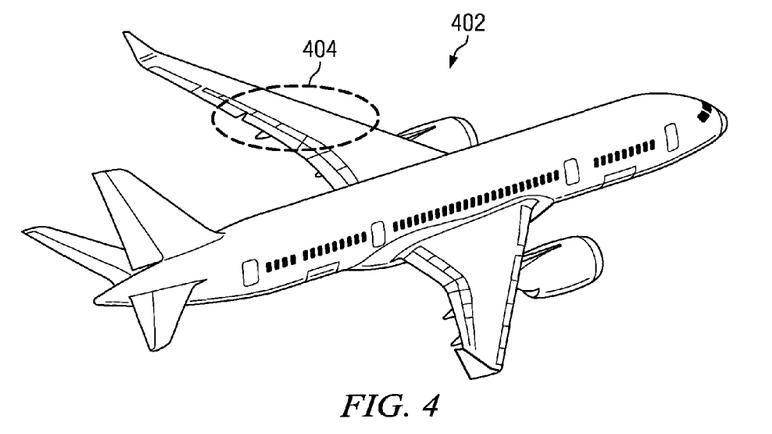
FIG. 4 is an illustration of an aircraft in which an advantageous embodiment may be implemented.

Turning now to FIG. 4, an illustration of an aircraft is depicted in accordance with an advantageous embodiment. Aircraft 402 may be any type of aircraft which uses wing fuel tanks. Aircraft 402 may be one implementation of one embodiment of aircraft 200 as illustrated in FIG. 2. Inside the wing fuel tanks may be section 404. Section 404 may be one portion of one implementation of one embodiment of airframe 202 of FIG. 2. Section 404 may comprise a stringer, a fuel dam, and a rib. Section 404 may be part of a fuel environment, such as fuel environment 300 as illustrated in FIG. 3.

Figure 5:
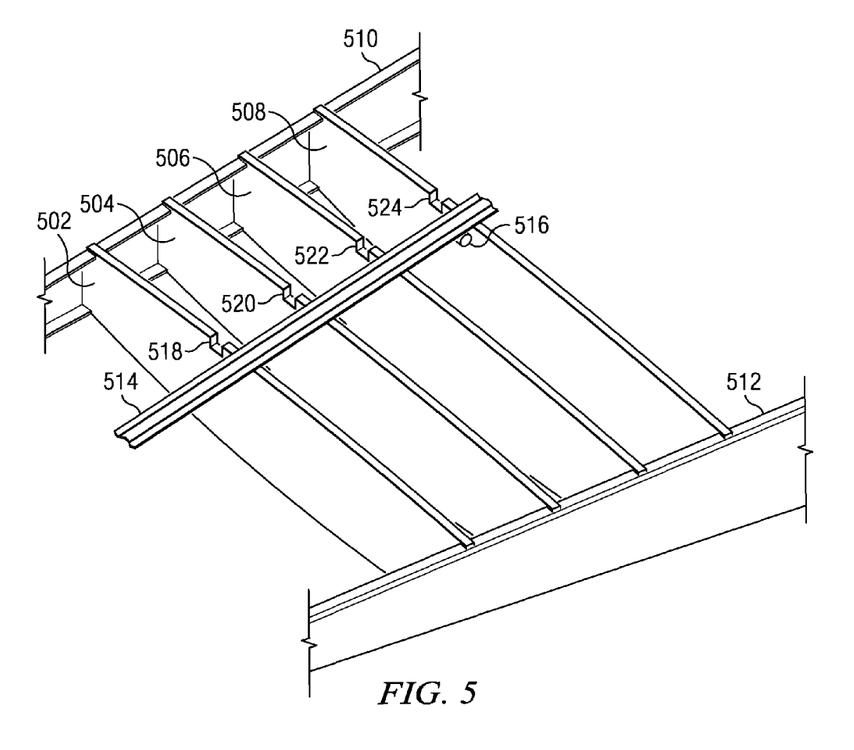
FIG. 5 is an illustration of the inside of a section of a wing of an aircraft in which an advantageous embodiment may be implemented.

Turning now to FIG. 5, an illustration of the inside of a section of a wing of an aircraft is depicted in accordance with an advantageous embodiment. Section 500 may be, but is not limited to, a section of a wing of an aircraft, such as section 404 of FIG. 4. Section 500 comprises ribs 502, 504, 506, and 508. Ribs 502, 504, 506, and 508 may be disposed between front spar 510 and rear spar 512. Front spar 510 and rear spar 512 may be the structural members of the wing, running along the wing at substantially right angles to the fuselage of an aircraft. Ribs 502, 504, 506, and 508 may each be one example of one implementation of rib 326 of FIG. 3. Stringer 514 also runs along the wing at substantially a right angle to the fuselage of the aircraft and is connected to ribs 502, 504, 506, and 508. Stringer 514 may be one example of one implementation of stringer 324 of FIG. 3. Fuel dam 516 is disposed where stringer 514 connects to rib 508. Fuel dam 516 may be one example of one implementation of seal dam 304 of FIG. 3. FIG. 5 depicts only a single stringer, stringer 514. However, more than one stringer may be located in section 500. Additionally, notches 518, 520, 522, and 524 may be located on ribs 502, 504, 506, and 508, respectively, for the addition of another stringer.

Figure 6:
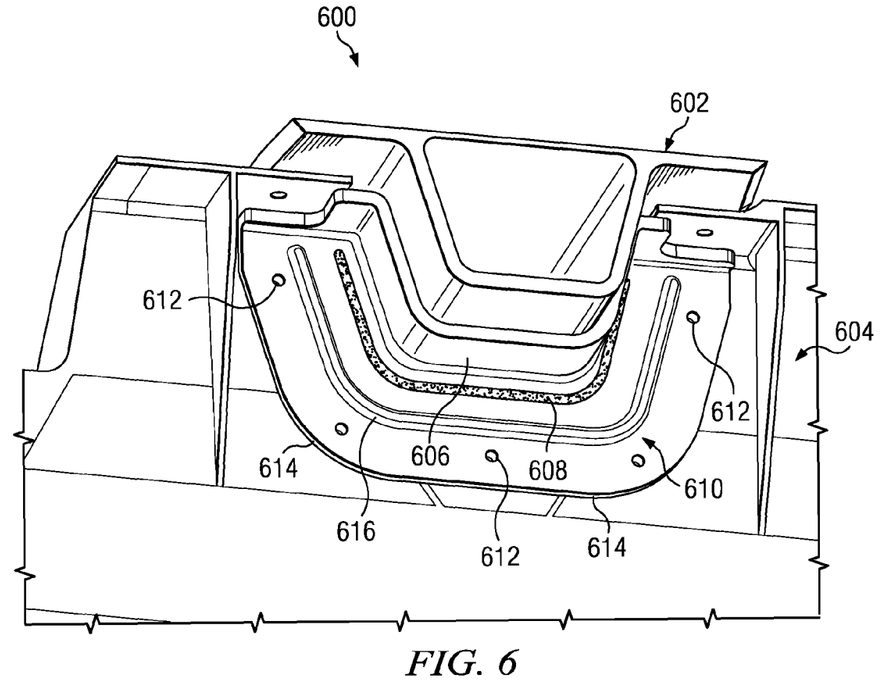
FIG. 6 is an illustration the inside of a section of a wing of an aircraft in which an advantageous embodiment may be implemented.

Turning now to FIG. 6, an illustration of the inside of a section of a wing of an aircraft is depicted in accordance with an advantageous embodiment. Section 600 may be inside of the wing in one of the fuel tanks where a rib connects to a stringer. Section 600 may be part of a fuel environment, such as fuel environment 300 as illustrated in FIG. 3. Section 600 may comprise stringer 602, rib 604, and fuel dam 606. Stringer 602 may be one implementation of one embodiment of first body 318 as shown in FIG. 3. Rib 604 may be one implementation of one embodiment of second body 320 as shown in FIG. 3. Fuel dam 606 may be one implementation of one embodiment of member 302 as shown in FIG. 3. Flexible portion 608 may be one example of one implementation of portion 308 of FIG. 3. Edge 614 may be an edge between rib 604 and fuel dam 606 where sealant may be applied. Section 610 is the part of fuel dam 606 connected to rib 604. Section 610 may be one example of one implementation of third portion 310 of FIG. 3.

Fuel dam 606 may be connected to rib 604 through an adhesive (not shown) and fasteners 612. In one or more illustrative embodiments, no fasteners 612 may be used or any number of fasteners 612 may be used. Flexible portion 608 may be one embodiment of second portion 308 as shown in FIG. 3. Bead 616 may be a stiffening bead. A stiffening bead may be used to reinforce the strength of fuel dam 606.

Figure 7:
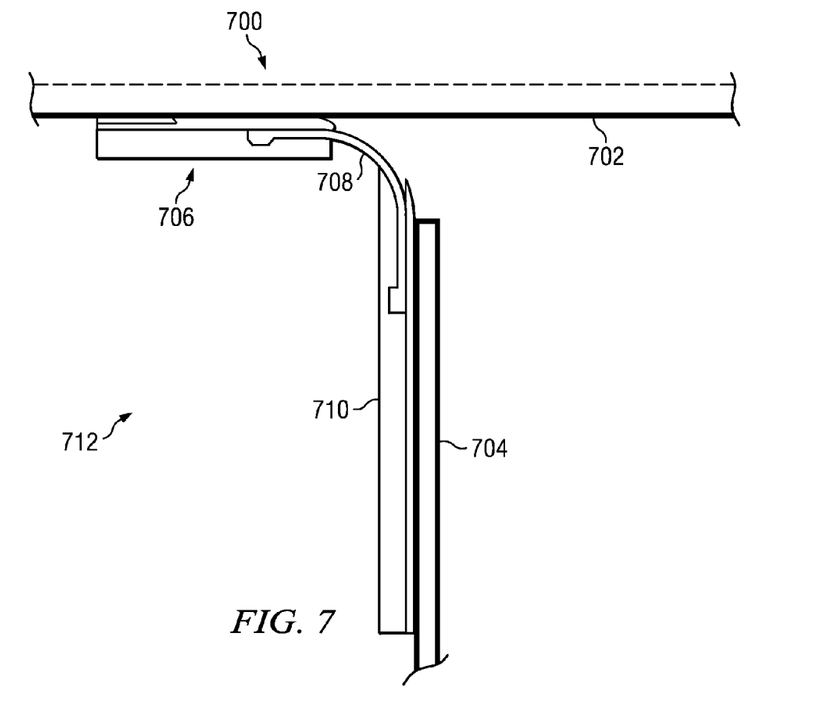
FIG. 7 is an illustration of a cross-section view of aircraft fuel dam in which an advantageous embodiment may be implemented.

Turning now to FIG. 7, an illustration of a cross-section view of a fuel dam is depicted in accordance with an advantageous embodiment. Section 700 may be a cross-section view of section 600 of FIG. 6. Section 700 may be part of a fuel environment, such as fuel environment 300 as illustrated in FIG. 3. Section 700 may comprise stringer 702, rib 704, and fuel dam 712. Stringer 702 may be one implementation of one embodiment of first body 318 as shown in FIG. 3. Rib 704 may be one implementation of one embodiment of second body 320 as shown in FIG. 3. Fuel dam 712 may be one implementation of one embodiment of member 302 as shown in FIG. 3.

Fuel dam 712 may comprise first portion 706, second portion 708, and third portion 710. First portion 706 and third portion 710 may enclose different areas of second portion 708. First portion 706 may be bonded and/or connected to stringer 702. Third portion 710 may be bonded and/or connected to rib 704. First portion 706 and third portion 710 may be bonded and/or connected by second portion 708.

Second portion 708 may be molded with, or encapsulated by, first portion 706 and third portion 710 to increase the deflection necessary to overcome the bond line peel strength. The deflection necessary to overcome the bond line peel strength is increased because second portion 708 now accommodates and absorbs some of the deflection. A bond line may be the lines upon which two surfaces are joined together. Peel strength may be a material's ability to resist forces that can pull it apart. Peel strength of a bond line may be the average load per unit width of bond line required to separate bonded materials where the angle of separation is 180-degrees. Second portion 708 may be a flexible material, such as, but not limited to rubber. It is appreciated that while FIG. 7 shows fuel dam 712 with different materials, fuel dam 712 may be comprised of the same material with second portion 708 being thinner than first portion 706 and third portion 710. Second portion 708 may be a material designed to provide flexibility. In one or more advantageous embodiments, the material may be a metal, and the metal may be molded with first portion 706 and third portion 710. Molding may be forming or shaping a plurality of materials together.

Figure 8:
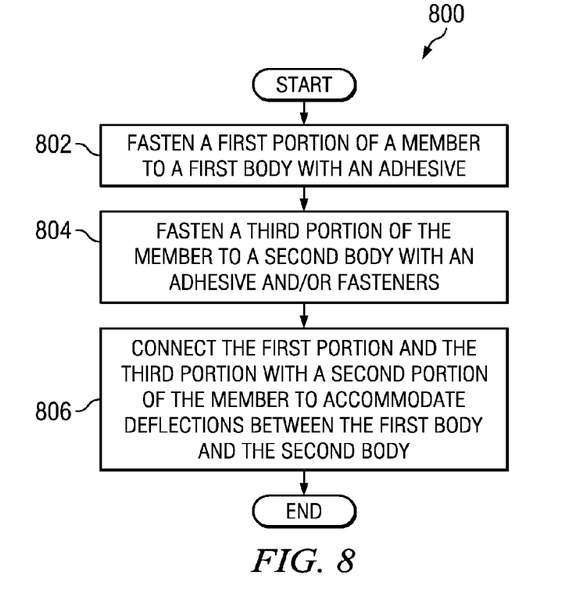
FIG. 8 is an illustration of a flowchart of a process for managing deflection in accordance with an advantageous embodiment.

FIG. 8 is an illustration of a flowchart of a process for managing deflection in accordance with an advantageous embodiment. The process is generally designated by reference number 800, and may be implemented in a fuel environment, such as fuel environment 300 illustrated in FIG. 3.

The process may begin by fastening a first portion of a member to a first body with an adhesive (operation 802). In an advantageous embodiment, for example, the operation may be done by fastening a fuel dam to a stringer. A third portion of the member is also fastened to a second body with an adhesive (operation 804). The first portion may be fastened or bonded first, the second portion may be fastened or bonded first, or both portions may be fastened or bonded at the same time. The first portion and the third portion are connected by a second portion of the structure (operation 806). Operation 806 may take place before operation 802. The second portion of the member may accommodate deflections by bending between the first body and the second body.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Embodiments of the present disclosure provide an apparatus, method, and system for managing deflections comprising a fuel dam, a first portion of the fuel dam connected with a stringer, a second portion of the fuel dam connected with the first portion, and a third portion of the fuel dam. The second portion is more flexible than the first portion. The third portion is connected with the second portion, and connected with a rib. The second portion accommodates deflection between the stringer and the rib.

The different advantageous embodiments recognize that currently, fasteners are used to connect a fuel dam to a stringer and a rib. The different advantageous embodiments recognize that to use fasteners with a hat stringer, a hole is cut into the hat stringer to allow the fasteners to be installed. Because the different advantageous embodiments use a flexible portion between the stringer and the rib, the use of fasteners to connect the fuel dam and the stringer are not needed. Additionally, the use of fasteners to connect the fuel dam to the rib is less than without the flexible portion.

The advantageous embodiments recognize that many fasteners are needed to decrease deflection which may cause sealant to break down. This problem is overcome by the advantageous embodiments because the advantageous embodiments use a flexible portion in the fuel dam to isolate the deflection away from the bond lines and sealant. Cost, time of installation, and maintenance are reduced with the use of fewer fasteners.

The advantageous embodiments recognize a fuel dam design that can be permanently attached to a wing structure without the use of fasteners and still allow deflection between the wing stringers and wing ribs. Deflection is managed by using a flexible material between the stringer and rib such as rubber and/or a material designed to provide flexibility. The fuel dam is bonded and/or fastened to the rib and bonded to the stringer with an adhesive. Since the material is flexible, the bond lines are not stressed due to the structural deflection between the stringer and rib. The flexible material will react to the fuel pressure loads, in addition to allowing the structural deflections. If a fastener feature is needed, a minimum number of fasteners could be added between the fuel dam and rib with minimal complexity.

Although the different advantageous embodiments have been described with respect to parts for aircraft, other advantageous embodiments may be applied to parts for other types of vehicles. For example, without limitation, other advantageous embodiments may be applied to other vehicles which have a need to provide a flexible component to accommodate deflection by bending.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand.

What is claimed is:

1. A fuel dam, comprising:
 a seal dam member;
 a first portion of the seal dam member connected with a first body;
 a second portion of the seal dam member connected with the first portion, wherein the second portion is more flexible than the first portion;
 a third portion of the seal dam member, wherein the third portion is connected with the second portion and connected with a second body, wherein the second portion bends to accommodate deflection between the first body and the second body; and
 wherein the first body comprises a first stiffener member and the second body comprises a second stiffener member.

2. The fuel dam of claim 1, wherein the first portion, the second portion, and the third portion are a same material, wherein the second portion is more flexible than both the first portion and the third portion.

3. The fuel dam of claim 1, wherein the first stiffener member is a stringer, and the second stiffener member is a rib.

4. The fuel dam of claim 1, wherein the second portion is a flexible material.

5. The fuel dam of claim 1, wherein the first body is an elongated structural member.

6. The fuel dam of claim 1, wherein the first portion, the second portion, and the third portion are a number of different materials.

7. The fuel dam of claim 1, wherein the first portion is connected with the first body with an adhesive, and wherein the third portion is connected with the second body with at least one of an adhesive and fasteners.

8. The fuel dam of claim 1, wherein the second portion may be encapsulated by the first portion and third portion.

9. The fuel dam of claim 1, wherein the second portion is molded with the first portion and third portion.

10. A method for managing deflection of a fuel dam between two bodies, the method comprising:
    connecting a first portion of a seal dam member to a first body;
    connecting a third portion of the seal dam member to a second body;
    connecting the first portion and the third portion with a second portion of the seal dam member to accommodate deflections by bending between the first body and the second body; and
    wherein the first body comprises a first stiffener member and the second body comprises a second stiffener member.

11. The method of claim 10, wherein the first portion, the second portion, and the third portion are a same material, wherein the second portion is more flexible than both the first portion and the third portion.

12. The method of claim 10, wherein the first stiffener member is a stringer, and the second stiffener member is a rib.

13. The method of claim 10, wherein the second portion is a flexible material.

14. The method of claim 10, wherein the first portion is fastened with the first body with an adhesive, and wherein the third portion is fastened with the second body with at least one of an adhesive and fasteners.

15. A system for managing deflections of a fuel dam, the system comprising:
    a structure comprising a first body and a second body;
    a first portion of a seal dam member connected with the first body;
    a second portion of the seal dam member connected with the first portion, wherein the second portion is more flexible than the first portion;
    a third portion of the seal dam member, wherein the third portion is connected with the second portion and connected with the second body, wherein the second portion accommodates deflection between the first body and the second body; and
    wherein the first body comprises a first stiffener member and the second body comprises a second stiffener member.

16. The system of claim 15, wherein the first portion and the third portion are connected with the first body and the second body, respectively, using an adhesive.

17. The system of claim 15, wherein the first portion, the second portion, and the third portion are a same material, wherein the second portion is more flexible than both the first portion and the third portion.

18. The system of claim 15, wherein the first body is an elongated structural member.

19. The system of claim 15, wherein the first portion, the second portion, and the third portion are a number of different materials.

20. The system of claim 15, wherein the second portion being more flexible than the first portion, isolates the deflection away from bond lines and sealant.

* * * * *